United States Patent [19]
Fioravanti

[11] Patent Number: 5,247,831
[45] Date of Patent: Sep. 28, 1993

[54] METHOD AND SYSTEM FOR MONITORING THE TIRE FOOTPRINTS OF A MOTOR VEHICLE, PARTICULARLY FOR AUTOMATICALLY OPTIMIZING THE BEHAVIOR OF THE MOTOR VEHICLE

[75] Inventor: Leonardo Fioravanti, Moncalieri, Italy

[73] Assignee: Fioravanti S.r.l., Turin, Italy

[21] Appl. No.: 688,950

[22] PCT Filed: Nov. 16, 1989

[86] PCT No.: PCT/EP89/01376
§ 371 Date: May 20, 1991
§ 102(e) Date: May 20, 1991

[87] PCT Pub. No.: WO90/05646
PCT Pub. Date: May 31, 1990

[30] Foreign Application Priority Data
Nov. 18, 1988 [IT] Italy .................. 6803 A/88

[51] Int. Cl.⁵ ............................................ G01C 21/00
[52] U.S. Cl. ........................................ 73/178 R; 73/146
[58] Field of Search ............. 73/146, 8, 9, 178 R; 364/424.01, 424.05, 424.1, 424.03, 426.01, 426.04, 426.02; 244/103 R, 111

[56] References Cited
U.S. PATENT DOCUMENTS
3,847,012 11/1974 Sperberg ............................ 73/146
5,092,166 3/1992 Wada et al. ........................ 73/146

Primary Examiner—Donald O. Woodiel
Attorney, Agent, or Firm—Sughrue, Mion, Zinn, Macpeak & Seas

[57] ABSTRACT

A method for controlling the movement of a motor vehicle provided with tires which cooperate with the ground to define respective footprints includes monitoring the behavior of the footprints and generating at least one respective footprint signal indicative of the behavior of the footprints, using the footprint signal to control the movement of the motor vehicle and detecting at least one driving control signal generated by the driver and processing the driving control signal in dependence on the footprint signal for controlling the movement of the motor vehicle. A suitable system for carrying out the method is provided which includes extensometric transducers incorporated in the flexible structure of the tire which will deform as a result of the tire bearing on the ground so as to generate signals indicative of the behavior of the bearing region of the tread.

40 Claims, 2 Drawing Sheets

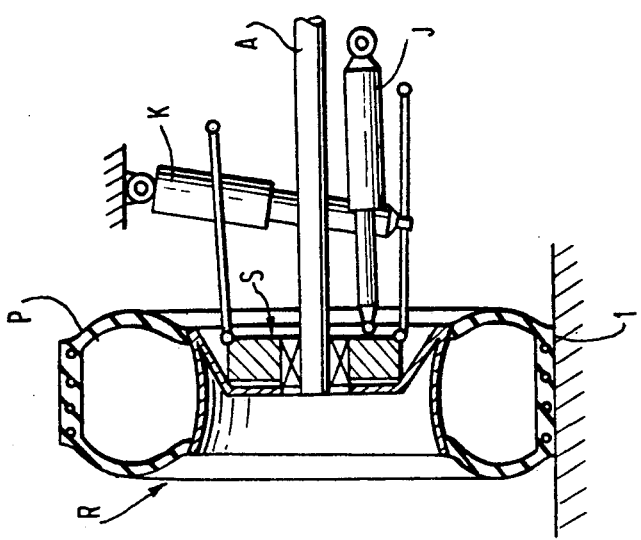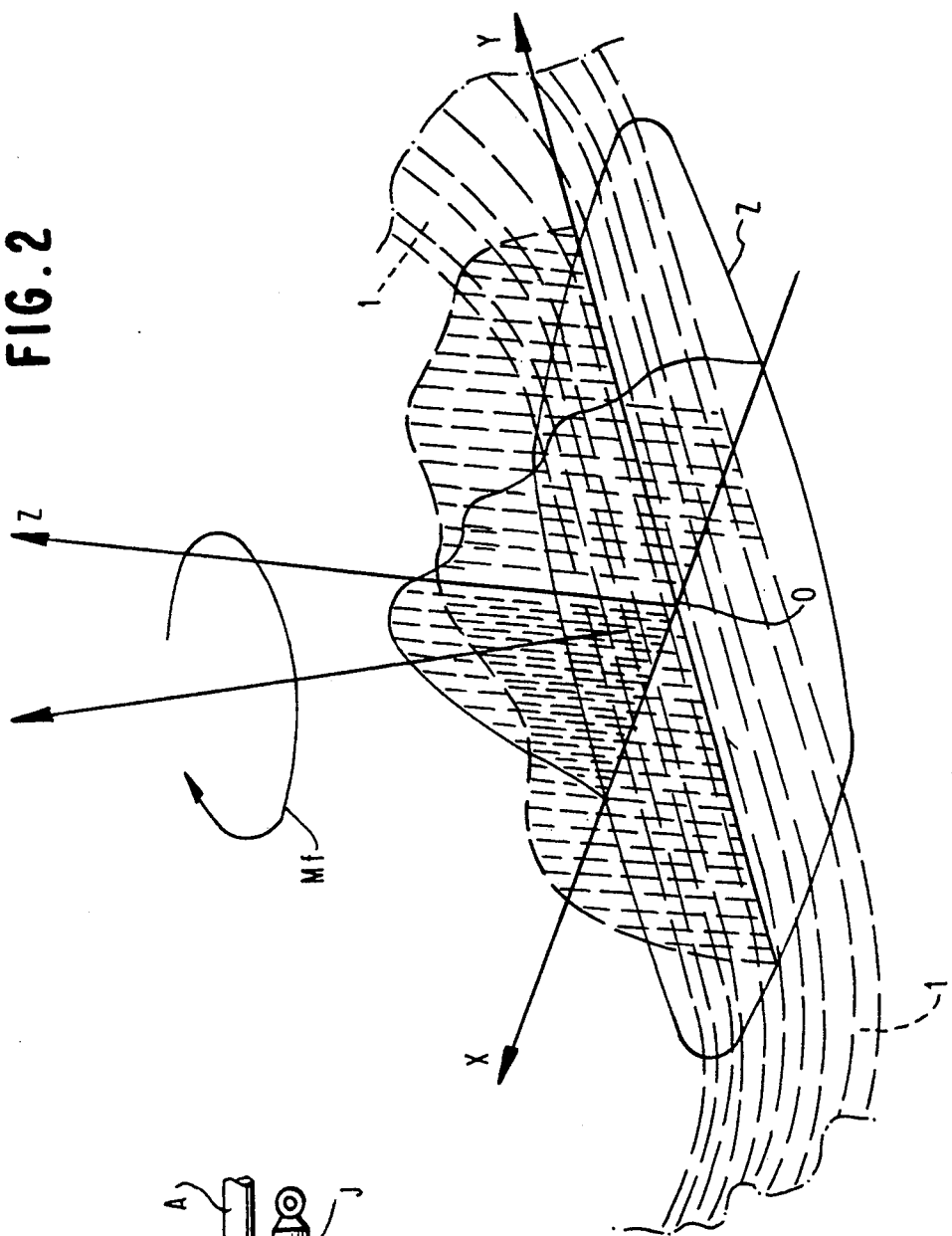

5,247,831

METHOD AND SYSTEM FOR MONITORING THE TIRE FOOTPRINTS OF A MOTOR VEHICLE, PARTICULARLY FOR AUTOMATICALLY OPTIMIZING THE BEHAVIOR OF THE MOTOR VEHICLE

BACKGROUND OF THE INVENTION

In recent years, with the increasing introduction of electronics to the automotive field, solutions which provide for the automatic control of one or more functions of the motor vehicle, such as, for example, the ignition, the fuel injection, the braking (in an antiskid function), the automatic engagement and disengagement of four-wheel drive, etc., have become widespread.

However, the problem of the interaction between the vehicle and the ground over which it is moving has not hitherto been dealt with in a completely satisfactory manner, particularly as regards the development of the forces and moments which act on the individual regions bearing on the ground, that is, on the tires.

It appears to be essential to be able to tackle and resolve this problem in order to be able to produce vehicles in which the modulated management of its bearing on the ground is possible during driving.

OBJECTS AND SUMMARY OF THE INVENTION

In order to satisfy the requirements stated above, a first aspect of the present invention relates to the fact that a motor vehicle may be considered as a system which interacts with the ground by means of the footprints of the tires, on which continually varying families of forces and moments are established.

More specifically, the present invention relates to a method for controlling the movement of a motor vehicle provided with tires which cooperate with the ground to define respective footprints including the steps of monitoring the behavior of the footprints and generating at least one respective footprint signal indicated of the behavior of the footprints, using the at least one footprint signal to control the movement of the motor vehicle, which is known—per se—e.g. from the Patent Abstracts of Japan, vol. 8, No. 143 (M-306) (1580) 04.07.1984 and JP-A-59 40 906 or DE-A-3 607 369. The object of the present invention is to provide means which enable the distribution of the forces between the various bearing regions to be controlled automatically so as to optimize the behavior of the motor vehicle according to the wishes of the driver and to prearranged reference programs, for example, for normal, sports, or off-road driving or for dry, wet or snowy road conditions, etc.

According to the present invention, that object is fulfilled by means of a method which further includes detecting at least one driving control signal generated by the driver of the motor vehicle and then processing that at least one driving control signal in dependence on the at least one footprint signal which a view to controlling the movement of the motor vehicle. The present invention also relates to a corresponding system wherein the step of monitoring the footprint of a motor vehicle tire on the ground includes the step of incorporating in the flexible structure of the tire, extensometric transducer means which can deform as a result of the tire bearing on the ground, and thus generate signals indicative of the behavior of the footprint.

The invention has been developed with particular attention to its possible use in motor vehicles having four wheels, all of which are driven and steerable (obviously with a braking capability) and are connected to the body of the motor vehicle by means of electronically-controlled suspension units.

A relevant characteristic of the invention is the fact that the behavior of the footprint of each tire on the ground can be monitored.

For this purpose, a further aspect of the present invention provides for the insertion of sensors associated to the wheels of the vehicle (which solution is known—per se—e.g. fro EP-A-0 233 357), such as piezoresistive elastomer elements constituted, for example, by toroidal bands inserted in the structure of the tire, in the tread region of each tire. The state of the forces and moments acting on the footprint of the tire can be monitored by means of these sensors.

On the basis of the footprint-behavior monitoring signals generated by these sensors and of other signals indicative, for example, of:

the dynamics of the center of gravity of the vehicle, the rotation of the wheels in the vertical plan (that is, the driving and braking forces acting about the axis of each wheel), the rotation of the wheels in the horizontal plane (that is, the steering angle), and the vertical movements of the wheels (that is, the forces acting o the suspension units), an automatic processing system enables the traveling conditions of the motor vehicle to be monitored in real time with separate reference to the conditions of each footprint, that is, of each wheel on the ground.

As well as performing the monitoring function, the processing system of the vehicle (which usually includes a processor for each wheel, provided principally for the purposes of detecting and calculating the characteristics of the respective footprint, and an intelligent central processor which correlates the various interactions of the processors associated with the individual wheels) also has a data base in which comparison and/or reference parameters are stored.

The parameters can be modified selectively according to the specific requirements of the driver, for example, for sports driving, for more relaxed driving, or for driving with maximum attention to safety conditions.

On the basis of the correlation of the various interactions of the processors and of the comparison of the monitoring data with the control parameters stored in its data base, the central processing system (which, at its upper level, preferably includes a so-called "expert system" with artificial intelligence functions, such as an ability to process heuristic decision-making methods) controls the various transmission, braking, steering and suspension members of the vehicle so as to optimize the performance and/or safety capabilities of the vehicle according to the driver's decisions. In particular, the system can continuously check the conditions of the footprint of each tire and make fine adjustments (trimming) moment by moment in order to achieve the best general balance of the motor vehicle.

The invention is preferably for use in a vehicle which has a mechanical-electrical-hydraulic system for the driving-braking, steering and suspension functions. Such a system includes an internal combustion engine which drives a high-pressure hydraulic pump, a set of hydraulic distributors for distributing the pressure to the various operating regions of the vehicle, hydraulic brakes-motors for each wheel, electro-hydraulic actuators for the steering and electro-hydraulic shock-absorber-actuators for the suspension units.

A vehicle provided with a system of the type specified above has an intrinsic natural "antiskid" function, as well as an automatic differential effect both transversely (as regards the wheels associated with the same axle) and longitudinally (as regards the distribution of the forces between the various axles).

DETAILED DESCRIPTION OF THE DRAWINGS

The invention will now be described, purely by way of nonlimiting example, with reference to the appended drawings, in which:

FIG. 1 is a vertical median sectional view of a motor vehicle wheel produced according to the invention, shown with some of the operating members associated therewith;

FIG. 2 is a three-dimensional cartesian graph showing a possible distribution of the forces and moments acting on a motor vehicle wheel produced according to the invention.

DETAILED DESCRIPTION OF THE INVENTION

Figure 3:
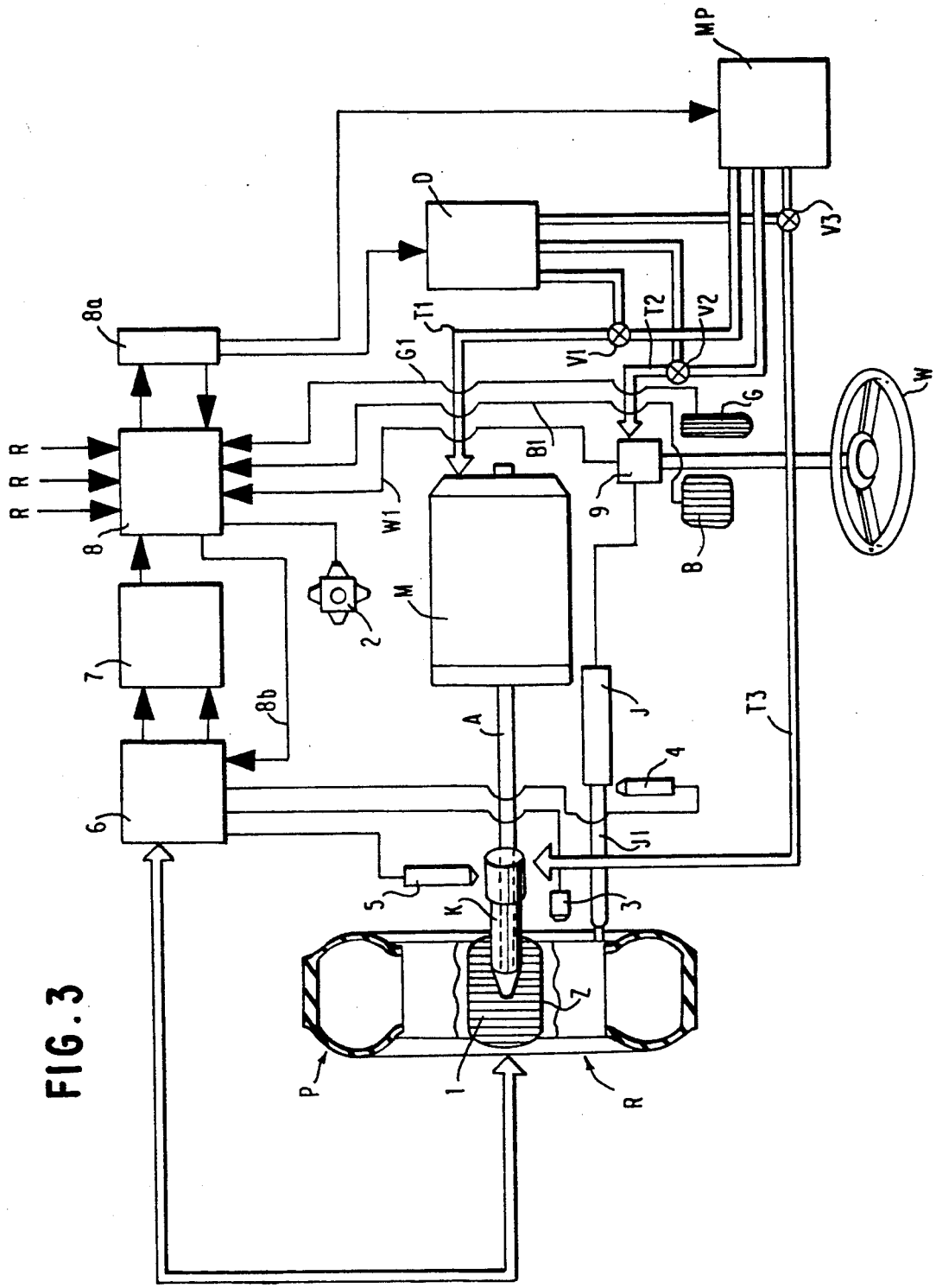
FIG. 3 shows schematically, in the form of a block diagram, the general architecture of a system according to the invention.

In FIG. 1, one of the wheels of a motor vehicle such as a motor car, not shown as a whole, is generally indicated 1.

According to a solution which is repeated in a practically identical manner in all the other wheels of the vehicle (for which detailed descriptions will not therefore be given since they would be redundant) the tire P of the wheel R carries within it, incorporated in its tread region, a plurality of piezoelectric sensors 1, preferably constituted by continuous or discontinuous toroidal bands made of piezoresistive rubber or another elastomer having the same properties and coextensive with the tread itself.

Rubbers of this type have recently been made available commercially. The essential characteristic of these rubbers is constituted by their capacity to generate electrical signals indicative of the amount by which they are deformed, and hence of the intensity of the forces causing the deformation, in dependence on the mechanical stresses to which they are subject.

The fact that rubbers with piezoelectric or piezoresistive characteristics can be used instead of other types of sensors (for example, conventional extensometers or strain gauges) offers the advantage that the sensors can be incorporated in the body of the tire P. In particular, the sensors 1 can be arranged in the tread region at a certain distance from the wearing layer of the tread so that they are at any rate protected from the outside environment.

As can be seen better in the schematic view of FIG. 2, in correspondence with the footprint (that is, the region Z of the tire P which bears on the ground), the sensors 1 (the number of which is such as to cover the monitored region with a sufficient density) follow the monitored region with a sufficient density) follow the deformation of the tread and are deformed along a line which is generally chordal relative to the shape of the wheel.

Since the amount and state of their deformation depend on the amount and state of the deformation of the tread which in turn are determined by the intensity of the forces and moments acting on the tread and hence on the wheel as a whole, the signals generated by the sensors obviously carry all the information relating to these forces and moments.

By processing the signals provided by the sensors 1 (processing which may be carried out according to wholly known criteria that do not therefore require a specific description) the forces can be resolved according to an x, y, z cartesian system centered about the point O which constitutes the center of the footprint Z, as shown schematically in FIG. 2. A similar result can also be obtained relating to the moments $M_f$ acting on the wheel R.

In particular, the value of the local coefficient of friction $\mu_1$ at a particular time can be calculated for each wheel R of the vehicle from the footprint-monitoring signals generated by the sensors 1.

With reference again to the diagram of FIG. 3, a drive-shaft, indicated A, rotates the rotating bearing S to which the wheel R is fixed according to the usual criteria. The drive-shaft A is driven by a motor M constituted, in the currently preferred embodiment, by a hydraulic motor which receives the pressurized fluid necessary for its operation from an engine-pump unit MP.

The unit in question is usually constituted by the internal combustion engine of the motor vehicle and an associated hydraulic pump.

The same engine-pump unit MP pilots a hydraulic actuator, such as a jack J, the rod J1 of which controls the steering movement of the wheel R.

A further jack K acts as a suspension unit which regulates the vertical position of the wheel relative to the body of the motor vehicle.

The pipes through which the engine-pump unit MP sends the operating fluid to the hydraulic motor M and the jacks J, K are schematically indicated $T_1$, $T_2$, $T_3$.

The passage of the operating fluid through the pipes is controlled by respective valves $V_1$, $V_2$ and $V_3$ which are controlled by a distributor D governed by a central control unit according to criteria which will be described further below.

However, it should be stated that, although the present description refers to the use of electro-hydraulic distributors, motors and actuators for controlling the driving-braking, steering and suspension functions of the wheels, this selection should not be considered critical for carrying out the invention. In fact, the invention can also be used in connection with motors and actuators of different kinds, for example, fully electrical motors and actuators. The use of electro-mechanical or mechanical systems should also be regarded as included in the scope of the present invention.

The progressive reference numbers 2 to 5 indicate a plurality of sensors constituted, more precisely, by:

a sensor 2 for sensing the dynamics of the center of gravity of the motor vehicle and constituted, for example, by a sensor located substantially at the center of gravity of the motor-vehicle body for measuring acceleration along three axes, a sensor 33 for sensing the "vertical" position of the wheel, that is, the attitude of the suspension.

Sensors which satisfy the applicational requirements described are widely known in the art and have been proposed many times for use in the automotive field.

A processor, generally indicated 6 (constituted, for example, by a microprocessor or by a functional area of such a component) is connected to the sensors 1 (by the criteria used in the art for the connection, for example, of tire-pressure sensors) as well as to the other sensors 3 to 5 just described.

The function of the processor 6 is essentially to process the set of signal supplied by the various sensors so as to provide a complete picture in real time of the conditions under which the wheel is operating at any particular time, that is, the set of data relating to the forces and moments acting on the wheel and the data relating to the rate of rotation, the orientation and the "height" of the wheel relative to the vehicle body, possibly with the addition of data relating to the general kinematics of the motor vehicle, detected at the center of gravity by the sensor 2.

The data generated by the processor 6 or data resulting from further processing of these starting data (for example, the data relating to the local coefficient of friction $\mu_1$) are compared with corresponding control and reference parameters stored in a data base 7.

In this connection, it should be noted that a respective processor is associated with each wheel R of the vehicle. The data generated by the various processors 6 (as well as the signal generated by the accelerometric sensor 2) are then sent to a centralized, higher-level processor B which acts on a central control unit 8a for controlling the distributor D, possibly with adaptive feedback to the various processors 6 (line 8b).

As regards the data base 7, it is therefore possible to opt for either a decentralized solution (each processor 6 having a respective data base 7 of control or reference data) or a centralized solution (the signals generated by the various processor 6 being sent to a single centralized data base 7 for comparison), or even for a hybrid solution in which some functions are decentralized and other functions are centralized. Naturally, the selection of one solution or another is dictated by the specific requirements applying at the time in questions.

The purpose of the comparison with the data contained in the data base 7 is to check whether the operating conditions of each wheel at a particular time fall within a range which coincides with or deviates to an acceptable degree from the ideal conditions represented by the reference or comparison parameters stored in the data base 7.

For example, a value of the coefficient of friction $\mu_1$ which is considered ideal for the conditions of the road surface may be stored in the data base 7 and the value $\mu_1$ detected locally at a particular time compared therewith.

The driving control operations carried out by the driver are taken into account when the comparison is made.

For this purpose, respective sensors of known type are associated with the control members operated by the driver (for example, the steering wheel W, the brake pedal B and the accelerator pedal G) but only one of the sensors, that is, the one associated with the steering box W and indicated by the reference number 9, is shown. The sensors in question send signals indicative of the control operations carried out by the driver (steering, acceleration, braking, etc.) to the central processor 8 on respective output lines $W_1$, $B_1$ and $G_1$.

In general terms, the function of the central processor 8 is to transfer to the operating members of the wheel (that is, the drive motor M, the steering jack J, the suspension-control jack K) respective movement—or steering-control signals which translate the commands given by the driver when he operates the steering wheel W and the pedals, B, G. However, the transmission (or the comparison between the data relating to the operation conditions of the wheels R, generated by the processors 6) and the control or reference data stored in the data base or data bases 7, with the interactive correlation of the data received from the various process calculators 6.

In practice, for example, if the driver operates the accelerator pedal G and attempts to impose on the vehicle an acceleration and/or a speed which is incompatible with the road-holding conditions of the wheels (as indicated by the reference or comparison data stored in the data base 7), the processor 8 modifies the acceleration signal which is effectively transmitted to the drive motors M of the wheels so as to keep the acceleration and/or speed imparted to the vehicle within the safety limits.

As has been seen, the data base 7 may contain several sets of control or reference data which can be used as alternatives to one another (for example, in the form of memory arrays which can be introduced alternatively by the user at will). The comparison data or parameters, that is, the level of criticality of the traveling conditions to be reached can thus be varied selectively, for example, it is thus possible to choose a closer approach to critical conditions if a sporting style of driving is desired or, for example, when the vehicle is entrusted to a learner driver—to choose to restrict the performance of the motor vehicle to the conditions of maximum safety.

To advantage, the processor 8 may be arranged so that it is brought automatically to the latter condition when a breakdown is detected.

The management achieved by the system in a motor vehicle with four driven and steerable wheels is extremely flexible to the extent that it even enables apparently conflicting comments to be imparted to the various wheels, for example, to increase the rate of rotation of some wheels while braking others, to modify the steering attitude of one wheel even to an attitude opposite that which would be imparted thereto in a conventional steering system, or even selectively to modify the suspension characteristics of the various wheels even in competition with each other.

This independent control function for each wheel can easily be achieved by the processor 8 through the central control unit 8a (which can also be produced either in a decentralized form—with a module for each wheel—or in a centralized form—with a single centralized control unit) by means of the distributor or distributors D which control the valves $V_1$, $V_2$ and $V_3$ for controlling the supply of operating fluid to the motors M and the jacks J and K.

It is thus possible for the motor vehicle as a whole to be configured as a system which interacts with the road by means of the footprints Z of the tires, by virtue of the monitoring of the continually varying forces and moments acting thereon. It is thus possible automatically to control the distribution of these forces between the various tires, that is, between the various bearing regions of the vehicle, so as to optimize the behavior of the motor vehicle according to the wishes of the driver and to prearranged reference programs, perhaps even for different driving styles or for different road-surface conditions.

I claim:

1. A method for controlling the movement of a motor vehicle provided with tires which cooperate with the ground to define respective footprints, including the steps of:
   monitoring the behavior of the footprints and generating at least one respective footprint signal indicative of the behavior of the footprints,
   using the at least one footprint signal to control the movement of the motor vehicle,
   detecting at least one driving control signal generated by the driver of the motor vehicle and then processing the at least one driving control signal in dependence on the at least one footprint signal to provide at least one control signal, and
   applying said one control signal to control means for controlling the movement of the motor vehicle.

2. A method according to claim 1, wherein at least one footprint signal is generated by monitoring the deformation of the tread region of the tire, the deformation of the tread region of the tire, the deformation being indicative of the forces and moments on the tire.

3. A method according to claim 1, further comprising processing the at least one footprint signal including comparing the signal with at least one reference or control datum previously stored in a memory.

4. A method according to claim 3, wherein the at least one stored reference or control datum can be varied selectively according to different driving conditions or different ground conditions.

5. A method according to claim 3, wherein the movement of the motor vehicle is controlled automatically with the use of:
   a first-level processing capability associated with each wheel of the motor vehicle for detecting the at least one footprint signal and comparing it with the at least one reference or control datum for each wheel of the motor vehicle, and
   a second-level processing capability which can control the movement of the motor vehicle in dependence on messages received from the first-level processing capabilities associated with the various wheels of the motor vehicle.

6. A method according to claim 5, including applying artificial intelligence methods in the second-level processing capability.

7. A method according to claim 1, wherein at least one respective footprint signal is generated for each wheel of the motor vehicle and the footprint signals generated for the various wheels of the motor vehicle are used in a correlated manner for controlling the movement of the motor vehicle.

8. A method according to claim 1, further comprising selectively controlling, in dependence on the at least one respective footprint signal, at least one physical quantity selected from a group of quantities constituted by:
   the rate of rotation of the wheels,
   the steering angle of the wheels, and
   the attitude of the suspension units of the wheels.

9. A method according to claim 8, wherein the quantities included in said group are controlled primarily by electrical, electromechanical or mechanical means.

10. A method according to claim 8, wherein the quantities included in said group are controlled primarily by fluid-operated means.

11. A method according to claim 1, further comprising generating at least one sensor signal selected from a group constituted by:
   a signal indicative of the dynamics of the center of gravity of the motor vehicle,
   a wheel-rotation signal,
   a signal indicated of the steering angle of the wheels, and
   a signal indicative of the attitude of the suspension units of the wheels, and
   wherein that at least one sensor signal is processed with the at least one footprint signal for use in controlling the movement of the motor vehicle.

12. A method according to claim 11, further comprising controlling in a coordinated manner, using the at least one respective footprint signal and for all the wheels of the motor vehicle, the following physical quantities:
   the rate of rotation of the wheel,
   the steering angle of the wheel, and
   the attitude of the suspension of the wheel.

13. A method according to claim 12, wherein the respective footprint signals are generated for all the wheels of the motor vehicle.

14. A method according to claim 1, wherein the step of monitoring the footprint of a motor vehicle tire on the ground includes the step of incorporating in the flexible structure of the tire extensometric transducer means which can deform as a result of the tire bearing on the ground, and thus generate signals indicative of the behavior of the footprint.

15. A method according to claim 14, wherein piezoelectric or piezoresistive elastomers are used to form the extensometric transducer means.

16. A method according to claim 14 including the step of incorporating the extensometric transducer means in the tread of the tire.

17. A method according to claim 16, including the step of incorporating the extensometric transducer means in the flexible structure of the tire at a certain distance from the wearing surface of the tread.

18. A method according to claim 1, wherein the step of monitoring the footprint of a motor vehicle tire on the ground, includes the step of incorporating in the flexible structure of the tire extensometric transducer means which can deform as a result of the tire bearing on the ground, and thus generate signals indicative of the behavior of the footprint, wherein the extensometric transducer means are arranged in toroidal formations substantially coextensive with the tread of the tire.

19. A method according to claim 18, wherein piezoelectric or piezoresistive elastomers are used to form the extensometric transducer means.

20. A method according to claim 18 including the step of incorporating the extensometric transducer means in the tread of the tire.

21. A method according to claim 18, including the step of incorporating the extensometric transducer means in the flexible structure of the tire at a certain distance from the wearing surface of the tread.

22. A system for controlling the movement of a motor vehicle provided with tires which cooperate with the ground to define respective footprints including:
   monitoring means which are sensitive to the behavior of the footprints and can generate at least one respective footprint signal indicate of the behavior of the footprint, processing means and control means which can use the at least one footprint signal to control the movement of the motor vehicle, and detecting means for detecting at least one driving control signal generated by the driver of the motor vehicle and supplying the control signal to said processing means for processing the at least one driving control signal in dependence on the at least one footprint signal, wherein said processing means then supplies said control signal to said control means for controlling the movement of the motor vehicle.

23. A system according to claim 22, wherein the monitoring means are sensitive to the deformation of the tread region of the tire, the deformation being indicative of the forces and moments acting on the tire.

24. A system according to claim 22, further comprising comparison means for comparing the at least one footprint signal with at least one reference or control datum previously stored in a memory.

25. A system according to claim 24, wherein the comparison means include separate memory functions so as to vary selectively the at least one reference or control datum according to different driving conditions or different ground conditions.

26. A system according to claim 22, further comprising sensor means for generating at least one respective footprint signal for each wheel of the motor vehicle, and processing means for correlating the footprint signals generated for the various wheels of the motor vehicle for use in controlling the movement of the motor vehicle.

27. A system according to claim 22, further comprising actuator means provided for controlling selectively, in dependence on the at least one respective footprint signal, at least one of the physical quantities selected from a group constituted by:
the rate of rotation of the wheels,
the steering angle of the wheels, and
the attitude of the suspension units of the wheels.

28. A system according to claim 27, wherein the actuator means are constituted primarily by fluid actuator means.

29. A system according to claim 22, further comprising sensor means selected from a group constituted by:
a sensor for sensing the dynamics of the center of gravity of the motor vehicle,
a sensor for sensing the rate of rotation of the wheels,
a sensor for sensing the steering angle of the wheels, and
a sensor for sensing the attitude of the suspension units of the wheels, and
in that the signals generated by the sensors are processed with the at least one footprint signal for use in controlling the movement of the motor vehicle.

30. A system according to claim 22, wherein all the wheels of the motor vehicle are provided with actuator means for controlling:
the rate of rotation of the wheel,
the steering angle of the wheel, and
the attitude of the suspension of the wheel.

31. A system according to claim 22, wherein for controlling the movement of the motor vehicle, there are provided:
first-level processing means which are associated with each wheel of the motor vehicle and can detect the at least one tread signal and compare it with the at least one reference or control datum for each wheel of the motor vehicle, and
second-level processing means which can control the movement of the motor vehicle in dependence on messages received from the first-level processing means associated with the various wheels of the motor vehicle.

32. A system according to claim 31, wherein the second-level processing means include an expert system.

33. A system according to claim 22, wherein the monitoring means includes extensometric transducer means incorporated in the flexible structure of the tire and able to deform as a result of the tire bearing on the ground, so as to generate signals indicate of the behavior of the bearing region of the tread.

34. A system according to claim 33, wherein the extensometric transducer means comprise transducers made from piezoelectric or piezoresistive elastomers.

35. A system according to claim 33, wherein the extensometric transducer means are incorporated in the tread of the tire.

36. A system according to claim 35, wherein the extensometric transducer means are located at a certain distance from the wearing surface of the tread.

37. A system according to claim 22, wherein the monitoring means includes extensometric transducer means incorporated in the flexible structure of the tire and able to deform as a result of the tire bearing on the ground, so as to generate signals indicative of the behavior of the bearing region of the tread, wherein the extensometric transducer means are formed as toroidal formations substantially coextensive with the tread of the tire.

38. A system according to claim 37, wherein the extensometric transducer means comprise transducers made from piezoelectric or piezoresistive elastomers.

39. A system according to claim 37, wherein the extensometric transducer means are incorporated in the tread of the tire.

40. A system according to claim 37, wherein the extensometric transducer means are located at a certain distance from the wearing surface of the tread.

* * * * *